(12) United States Patent
Chan et al.

(10) Patent No.: US 8,031,430 B2
(45) Date of Patent: Oct. 4, 2011

(54) SYSTEM, METHOD, AND APPARATUS FOR LIGHTWEIGHT SPOILER WING DESIGN FOR DE-POPULATED DISK DRIVES

(75) Inventors: Andre S. Chan, Milpitas, CA (US); Chisin Chiang, San Jose, CA (US); Ferdinand Hendriks, Morgan Hill, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 1180 days.

(21) Appl. No.: 11/533,850

(22) Filed: Sep. 21, 2006

(65) Prior Publication Data
US 2008/0074781 A1   Mar. 27, 2008

(51) Int. Cl.
*G11B 5/012* (2006.01)
(52) U.S. Cl. .................................. 360/97.01; 360/97.02

(58) Field of Classification Search ................. 360/97.02
See application file for complete search history.

(56) References Cited

U.S. PATENT DOCUMENTS

| 4,971,521 | A   | * | 11/1990 | Atarashi et al. | ............... | 416/233 |
| 6,549,365 | B1  | * | 4/2003  | Severson | .................. | 360/97.02 |
| 6,600,625 | B1  | * | 7/2003  | Munninghoff et al. | .... | 360/97.02 |
| 6,882,501 | B2  | * | 4/2005  | Machcha et al. | ........... | 360/97.03 |
| 2002/0008934 | A1 | * | 1/2002  | Tadepalli et al. | .......... | 360/97.02 |
| 2005/0185324 | A1 | * | 8/2005  | Suwa et al. | ................. | 360/97.02 |

* cited by examiner

*Primary Examiner* — Daniell L Negron
*Assistant Examiner* — Carlos E Garcia (57) ABSTRACT

A lightweight spoiler wing design for depopulated disk drives reduces unnecessary weight from the spoiler while maintaining the aerodynamic function and structural rigidity required. The invention includes spoiler designs having U-shapes with leading edge or trailing edge treatments, hollow boxes, L-shapes, vertical wall designs, and different bar support designs having upper and lower horizontal walls.

12 Claims, 6 Drawing Sheets

SYSTEM, METHOD, AND APPARATUS FOR LIGHTWEIGHT SPOILER WING DESIGN FOR DE-POPULATED DISK DRIVES

BACKGROUND OF THE INVENTION

1. Technical Field

The present invention relates in general to disk drives and, in particular, to an improved system, method, and apparatus for a lightweight spoiler wing design for depopulated disk drives.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The surface of the slider facing the disk is aerodynamically shaped to create an air bearing in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a substantially constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops a torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

In the prior art, a number of solutions have been proposed to enhance the air flow within hard disk drives, such as bypass channels located adjacent to the disk pack. For example, some disk drives have air guides that only guide a central portion of the flow of air back to the disks. Other disk drives have housings with doors that guide the flow of air from the disks to a filter, or they use diverter ramps that also only affect a central portion of the air flow.

Some disk drives utilize a spoiler wing that is inserted between the media storage disks. See, e.g., FIG. 1, wherein airflow 11 between a plurality of disks 13 is diverted by conventional spoilers 15 having a solid, rectangular cross-sectional profile in a fully populated disk drive 17. In fully populated drives (i.e., those that contain the maximum number of disks possible), the spoiler thickness is usually maximized to its nominal clearance, but is limited to the allowable stack dimensional tolerance. In drives designed for computer servers, this nominal clearance is typically around 0.4 mm.

Figure 2:
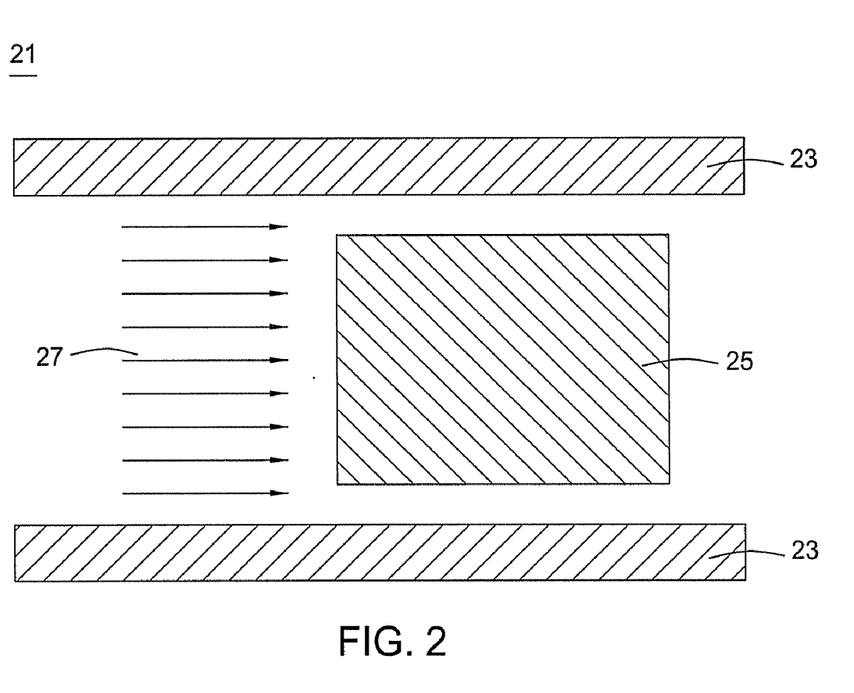
FIG. 2 is a sectional side view of a conventional, depopulated disk drive.

Depopulated disk drives contain a number of media storage disks that is less than the maximum number of disks allowable. In order to maintain maximum coverage (i.e., blocking of airflow to actuator arms, and/or increasing of flow into a bypass channel), the nominal clearance between spoiler and disk in depopulated disk drives is also kept to a minimum. For example, as illustrated in FIG. 2, the depopulated drive 21 lacks at least one disk between the two disks 23 that are shown. This configuration naturally increases the size and weight of the spoiler wing 25. However, the mass increase due to the simple increase in spoiler wing thickness serves no aerodynamic purpose with regard to airflow 27. On the other hand, with respect to structural integrity, having a large wing 25 between the disks 23 can have an adverse effect on performance, such as droop, worsened shock response, etc. Thus, an improved design that overcomes the disadvantages of the prior art would be desirable.

SUMMARY OF THE INVENTION

Multiple embodiments of a system, method, and apparatus for a lightweight spoiler wing design for depopulated disk drives are disclosed. The invention removes unnecessary weight from the spoiler while maintaining the aerodynamic function and structural rigidity required. In addition, the invention reduces the cost of the spoiler by reducing the amount of material required to fabricate the spoiler.

The invention employs a spoiler design having an increased percentage of airflow blockage for depopulated disk drive applications, as compared to fully populated disk drive applications. This difference is due to the smaller fraction of space required by the size of the parasitic gap relative to the total disk-to-disk spacing. Thus, spoilers are more effective in depopulated drives even though the airflow generated in depopulated drives is less intense than in fully populated drive applications. The various embodiments of the invention include, for example, spoiler designs having U-shapes with leading edge or trailing edge treatments, hollow boxes, L-shapes, vertical wall designs, and different bar support designs having upper and lower horizontal walls.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this

DETAILED DESCRIPTION OF THE INVENTION

Figure 3:
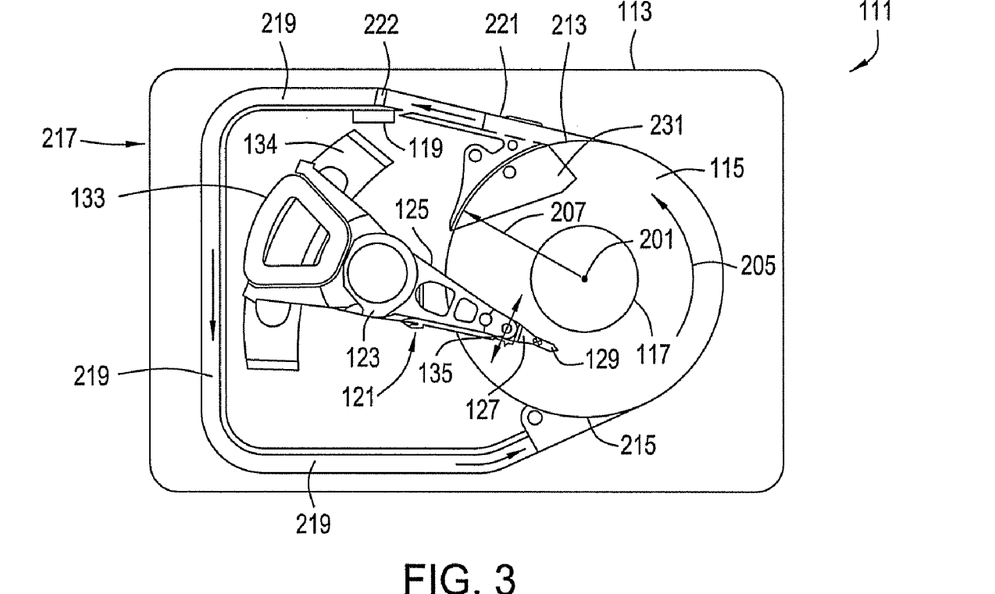
FIG. 3 is a plan view of one embodiment of a disk drive constructed in accordance with the present invention.

Referring to FIG. 3, one embodiment of a system, method, and apparatus for an information storage system comprising a magnetic hard disk file or drive 111 for a computer system having a lightweight spoiler wing design is shown. The invention is well suited for applications such as depopulated disk drives. Drive 111 has an outer housing or base 113 containing a disk pack having at least one media or magnetic disk 115. The disks 115 are rotated (see arrows 205) by a spindle motor assembly having a central drive hub 117. An actuator 121 comprises a plurality of parallel actuator arms 125 in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127.

Suspensions 127 bias the air bearing surface of the slider 129 against the disk 115 to cause the slider 129 to fly at a precise distance from the disk. A voice coil 133 free to move within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies along radial arcs across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

The disks 115 define an axis 201 of rotation 205 and radial direction 207 relative to the axis 201. The disks 115 have a downstream side 213 wherein air flows away from the disks 115, and an upstream side 215 wherein air flows toward the disks 115. The drive 111 also has a bypass channel 219 formed in the housing 113 for directing the air flow generated by rotation of the disks 115 from the downstream side 213 of the disk pack or disks 115 to the upstream side 215 of the disks 115. In the embodiment shown, the bypass channel 219 is located between an outer perimeter 217 of the housing 113 and the actuator 121, such that the bypass channel 219 completely circumscribes the actuator 121. In some HDD designs where there is not sufficient space to implement a full bypass channel (shown) the bypass channel 219 may be interrupted (not shown). This is known as a partial bypass. Furthermore, in order to help the bypass flow negotiate substantial angular changes (channel bends), one or more turning vanes may be placed in those areas.

Figure 1:
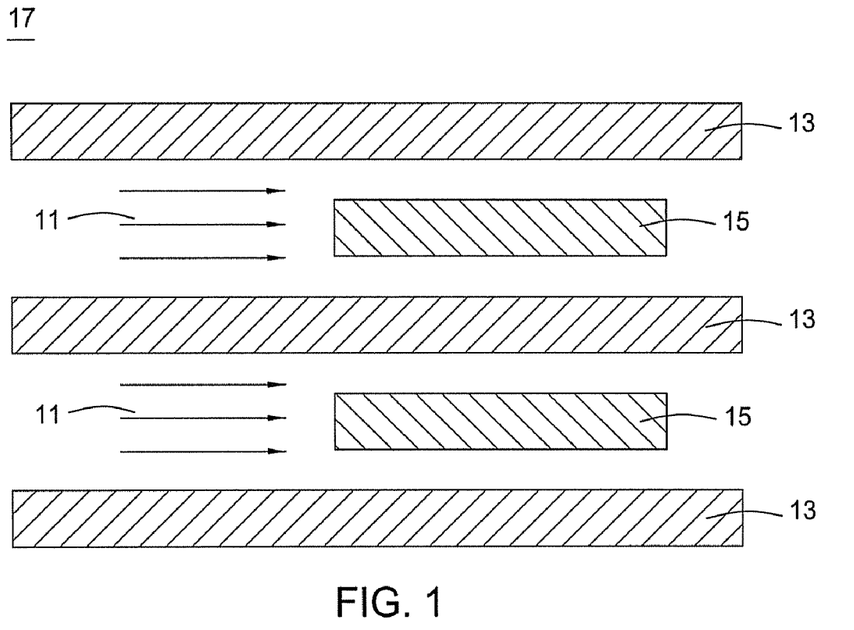
FIG. 1 is a sectional side view of a conventional, fully populated disk drive.
Figure 4:
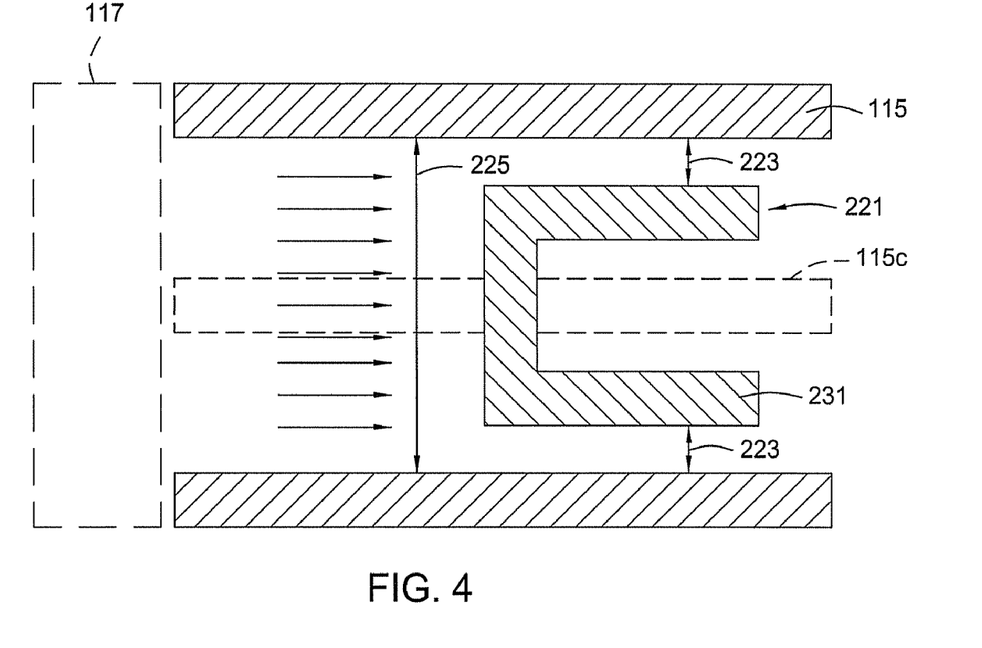
FIG. 4 is a schematic sectional side view of one embodiment of a depopulated disk drive having a airflow spoiler and is constructed in accordance with the present invention.
Figure 5:
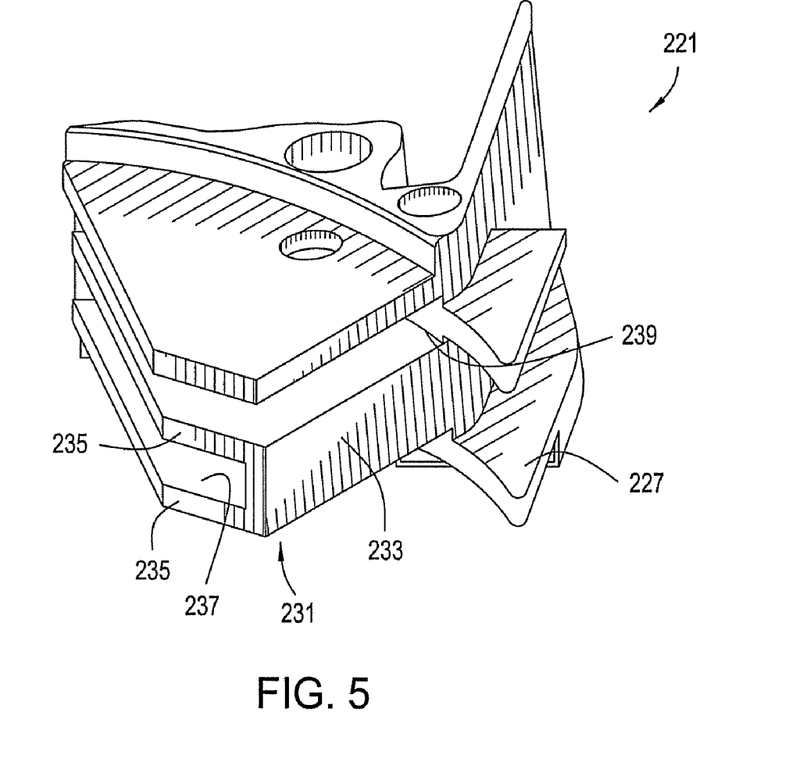
FIG. 5 is an isometric view of the spoiler of FIG. 4 and is constructed in accordance with the present invention.

Referring now to FIGS. 1, 4, and 5, one embodiment of the drive 111 constructed in accordance with the present invention also comprises a spoiler 221. In the embodiment shown, the spoiler 221 is partially located in the bypass channel 219 and is positioned adjacent to the downstream side 213 of the disks 115. Portions 227 of the spoiler 221 are also offset downstream from the disks 115 in the radial direction 207 by, for example, no more than approximately 0.5 mm, such that the spoiler 221 reduces air flow drag (i.e., base drag) from the disks 115 due to disk wake in the bypass channel 219.

For purposes of this invention, drive 111 is "depopulated" in the sense that hub 117 (FIG. 4) is capable of supporting, for example, three disks 115 but only has two disks 115 installed at its upper and lower ends. A third disk 115c (shown in phantom) is removed from hub 117, hence depopulating the drive 111. Although drive 111 is shown in one particular configuration it is not limited to that embodiment and may comprise more or fewer disks located at different positions with respect to each other and hub 117.

Unlike prior art designs for depopulated disk drives, the wing 231 of spoiler 221 does not have a solid profile in radial cross-section (see, e.g., FIG. 2). Rather, wing 231 is designed to provide a lightweight alternative having unnecessary weight removed therefrom while maintaining the aerodynamic function and structural rigidity required for other performance considerations. In addition, this design reduces the cost of the spoiler by reducing the amount of material required to fabricate the spoiler. Wing 231 has an increased percentage of airflow blockage for depopulated disk drives. This difference is due to the smaller fraction of space required by the size of the parasitic gap 223 relative to the total disk-to-disk spacing 225. Thus, spoilers are more effective in depopulated drives even though the airflow generated in depopulated drives is less intense than in fully populated drive applications. The various embodiments of the invention include, for example, spoiler designs having C-shapes with leading edge or trailing edge treatments, hollow boxes, L-shapes, vertical wall designs, and different bar support designs having upper and lower horizontal walls.

The configuration of wing 231 includes leading edge treatment in the form of closed C-shape having a base 233 and two side walls 235. In the embodiment shown, side walls 235 are parallel to each other and perpendicular to base 233, defining a rectangular void 237 therebetween. In plan view (FIG. 1), side walls 235 of wing 231 have a generally trapezoidal shape with an arcuate long side 239 (FIG. 5) that is complementary to the perimeter of disks 115.

Figure 6:
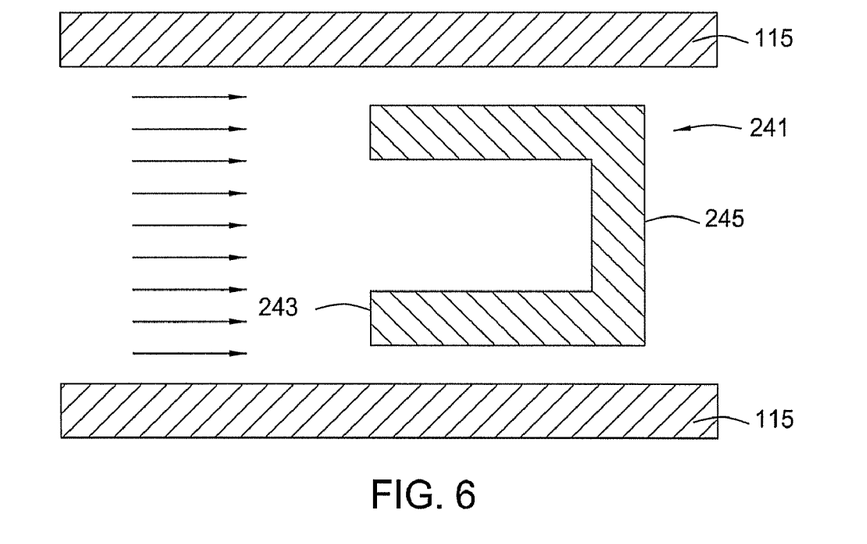
FIG. 6 is a schematic sectional side view of another embodiment of a depopulated disk drive having a airflow spoiler that is constructed in accordance with the present invention.

FIG. 6 depicts an alternate embodiment of the present invention that is illustrated with a spoiler 241. Spoiler 241 has a wing 243 that is also C-shaped but simply inverted with respect to wing 231, such that the base 245 of wing 243 is located at the trailing edge of wing 243 and the open end of wing 243 is located at the leading edge thereof. These C-shaped profiles may include one of a leading edge treatment and a trailing edge treatment, comprising an axial lateral portion extending between a pair of parallel longitudinal portions.

For depopulated embodiments of disk drives constructed in accordance with the invention, the hub 117 (FIG. 4) has a maximum number of at least two disk positions (e.g., three shown). At least one disk (e.g., two shown) is mounted to the hub, but there are fewer disks than the maximum number of at least two disk positions, such that a depopulated region (e.g., represented by phantom line 115*c*) having no disk is defined adjacent to the least one disk (e.g., the two disks 115). In the example of FIG. 4, the spoiler 221 is mounted to the housing 113 (FIG. 3) and is located adjacent to the actuator 121. Wing 231 extends from spoiler 221 adjacent to disks 115 in the depopulated region 115*c*. The wing 231 having leading and trailing edges, longitudinal and lateral portions that define a void therebetween, and a profile that is not solid in radial cross-section that incorporates the void to reduce a mass of the wing.

Figure 7:
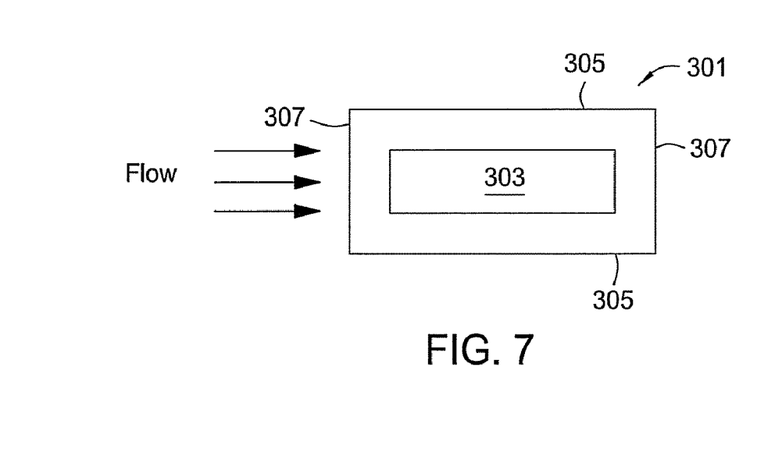
FIGS. 7-14 are schematic sectional side views of alternate embodiments of spoilers constructed in accordance with the present invention.
Figure 8:
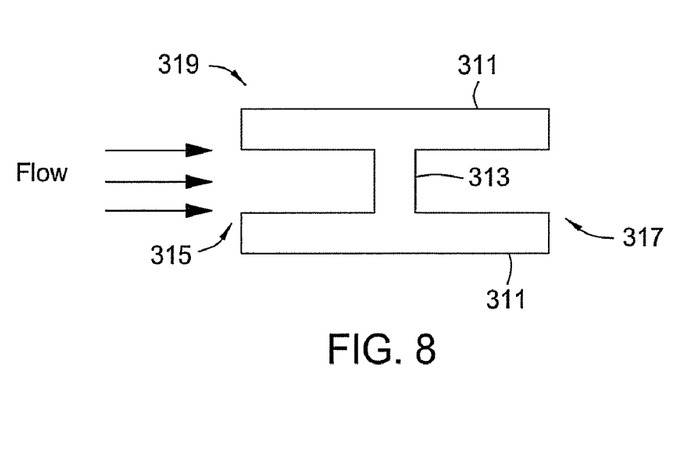
Figure 9:
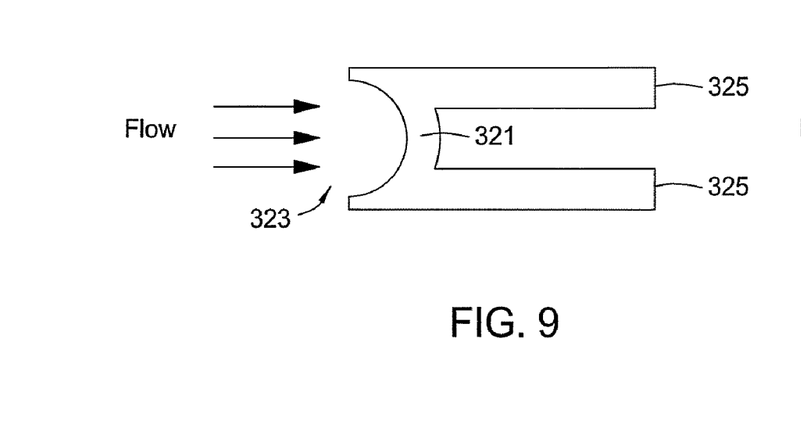

Other embodiments of the invention include the various wing configurations shown in FIGS. 7-14. For example, the profile of the embodiment of FIG. 7 is a closed rectangular box 301 having a hollow interior 303 defined inside a pair of parallel longitudinal portions 305 and a pair of perpendicular lateral portions 307. In FIG. 8, the profile is H-shaped and includes a pair of parallel longitudinal portions 311 and a perpendicular lateral portion 313 located between the leading and trailing edges 315, 317, respectively, of the wing 319. In FIG. 9, the lateral portion 321 is at the leading edge 323 and concave in shape, and a pair of parallel longitudinal portions 325 extend from the lateral portion 321.

Figure 10:
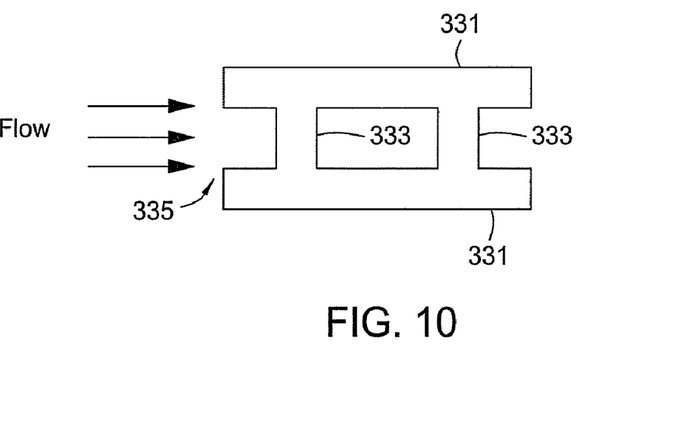
Figure 11:
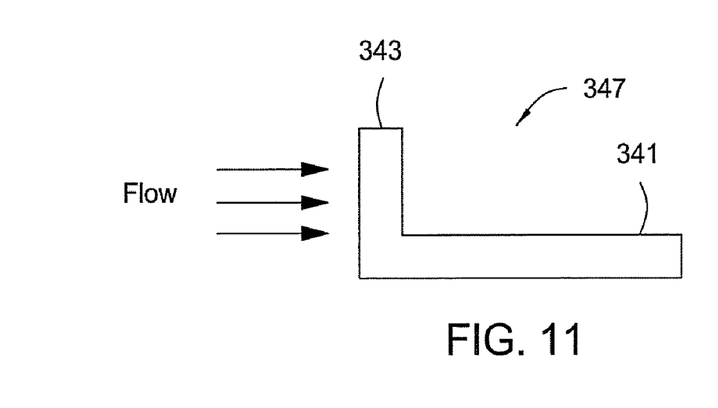
Figure 12:
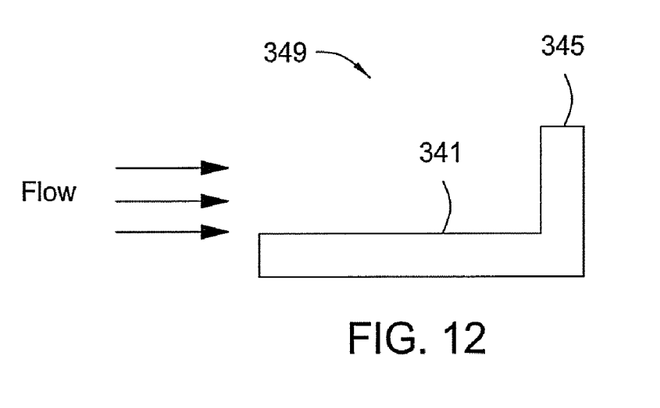
Figure 13:
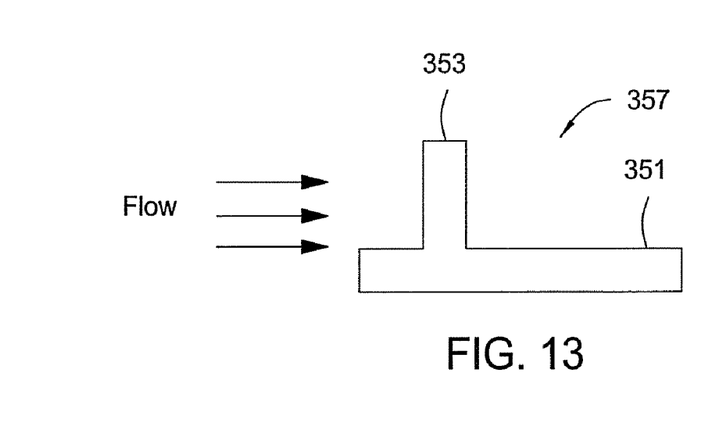
Figure 14:
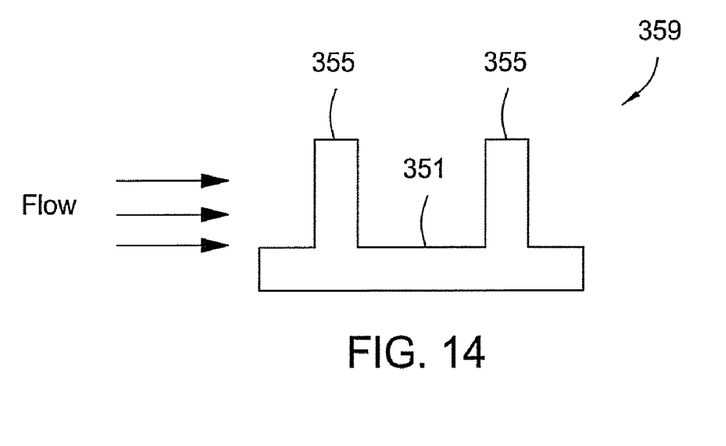

The embodiment of FIG. 10 has a profile that includes a pair of parallel longitudinal portions 331 and a plurality (e.g., two shown) of perpendicular lateral portions 333 located between the leading and trailing edges of the wing 335. In FIGS. 11 and 12, the profile is L-shaped and includes a longitudinal portion 341 and a perpendicular lateral portion 343, 345, respectively, located at one of the leading and trailing edges of the wing 347, 349, respectively. In the embodiments of FIGS. 13 and 14, the profile includes a longitudinal portion 351 and at least one (e.g., one and two shown, respectively) perpendicular lateral portion 353, 355 located between the leading and trailing edges of the wing 357, 359, respectively.

Figure 15:
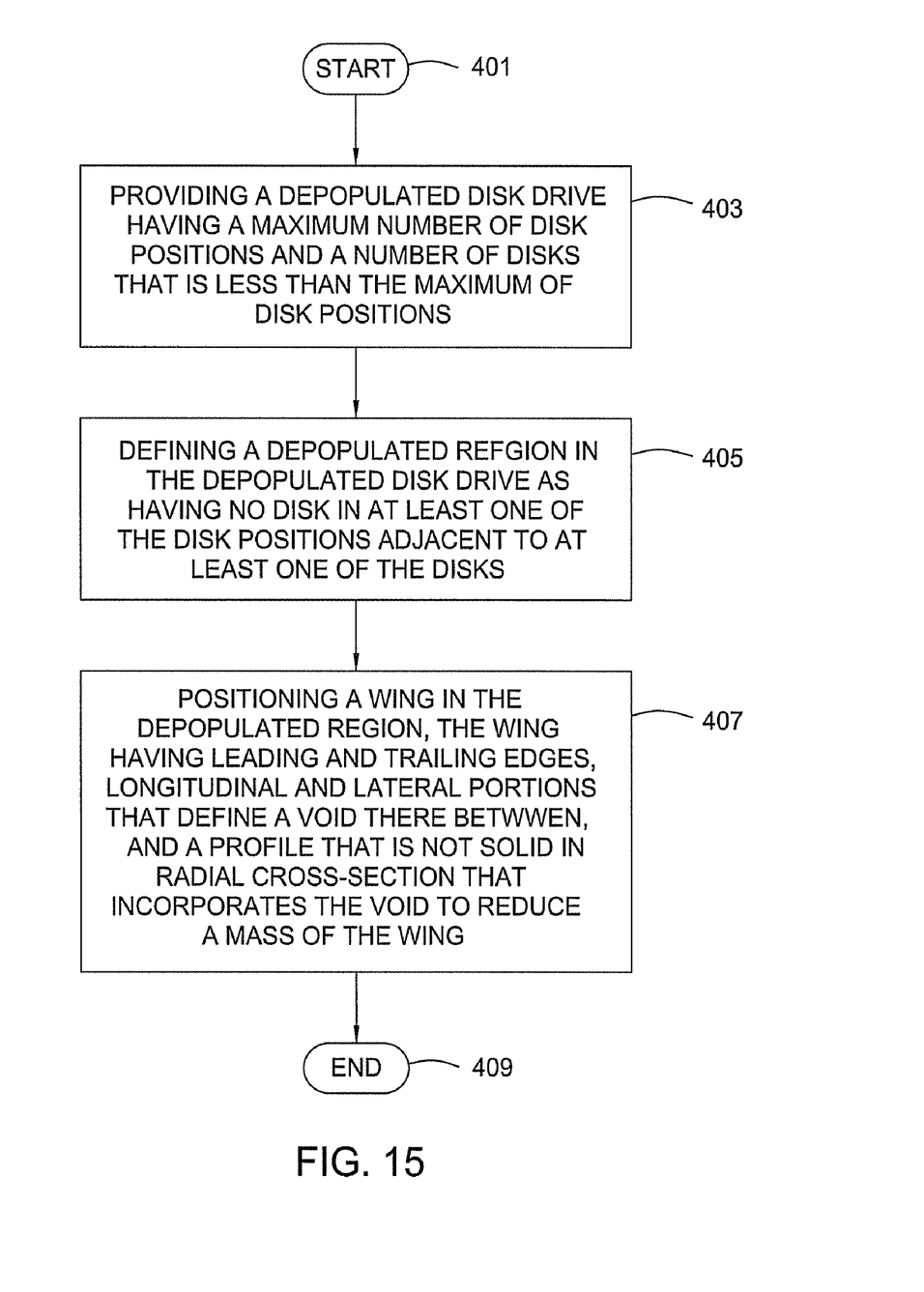
FIG. 15 is a high level flow diagram of an embodiment of an embodiment of a method.

Referring now to FIG. 15, the invention may comprise a method of improving the structural integrity and performance of a disk drive. In one embodiment, the method begins as indicated at step 401 and comprises providing a depopulated disk drive having a maximum number of disk positions and a number of disks that is less than the maximum number of disk positions (step 403); defining a depopulated region in the depopulated disk drive as having no disk in at least one of the disk positions adjacent to at least one of the disks (step 405); positioning a wing in the depopulated region, the wing having leading and trailing edges, longitudinal and lateral portions that define a void therebetween, and a profile that is not solid in radial cross-section that incorporates the void to reduce a mass of the wing (step 407); before ending as indicated at step 409.

While the invention has been shown or described in only some of its forms, it should be apparent to those skilled in the art that it is not so limited, but is susceptible to various changes without departing from the scope of the invention.

What is claimed is:

1. A disk drive, comprising:
a housing having a hub that defines an axis of rotation, a radial direction relative to the axis, and a maximum number of disk positions comprising at least two disk positions;
at least one disk mounted to the hub but less than the maximum number of disk positions, such that a depopulated region having no disk is defined adjacent said at least one disk, said at least one disk being rotatable relative to the housing;
an actuator mounted to the housing and being movable relative to said at least one disk, the actuator having a head for reading data from said at least one disk;
a spoiler mounted to the housing and located adjacent the actuator;
a wing extending from the spoiler adjacent said at least one disk in the depopulated region, the wing having leading and trailing edges, a longitudinal portion, a lateral portion extending perpendicularly from the longitudinal portion at the leading edge to define a rectangular leading edge, a void defined between the longitudinal and lateral portions aft of the leading edge, the trailing edge is open to the void such that the wing has a profile that is open and not solid; and
the wing is circumferentially spaced apart from the head such that no portion of the head circumferentially overlaps the wing.

2. A disk drive according to claim 1, wherein the wing has a second longitudinal portion extending aft from the leading edge and the lateral portion, parallel to and of equal length with said longitudinal portion, such that the leading edge is closed and the profile is C-shaped.

3. A disk drive according to claim 1, wherein the wing is open aft of the lateral portion to the trailing edge, the longitudinal portion comprises a single longitudinal portion, the lateral portion comprises a single lateral portion, and the profile is L-shaped.

4. A disk drive, comprising:
a housing having a hub that defines an axis of rotation, a radial direction relative to the axis, and a maximum number of disk positions;
disks mounted to the hub at less than the maximum number of disk positions, such that a depopulated region having no disk is defined between two adjacent ones of the disks, the disks being rotatable relative to the housing and having a downstream side wherein air flows away from the disks;
an actuator mounted to the housing and being movable relative to the disks, the actuator having a head for reading data from the disks;
a bypass channel formed in the housing for directing air flow generated by rotation of the disks;
a spoiler located in the bypass channel adjacent to the downstream side of the disks between the actuator and the bypass channel;
a wing extending from the spoiler between said two adjacent ones of the disks in the depopulated region, the wing having leading and trailing edges, a pair of longitudinal portions extending aft from the leading edge, a lateral portion extending perpendicularly between the longitudinal portions at the leading edge such that the leading edge is rectangular and closed, the longitudinal and lateral portions defining a void therebetween inside the wing, the trailing edge is open to the void, such that the wing has a C-shaped profile that is open and not solid; and the wing is circumferentially spaced apart from the head such that no portion of the head circumferentially overlaps the wing.

5. A disk drive, comprising:

a housing having a hub that defines an axis of rotation, a radial direction relative to the axis, and a maximum number of disk positions comprising at least two disk positions;

at least one disk mounted to the hub but less than the maximum number of disk positions, such that a depopulated region having no disk is defined adjacent said at least one disk, said at least one disk being rotatable relative to the housing;

an actuator mounted to the housing and being movable relative to said at least one disk, the actuator having a head for reading data from said at least one disk;

a spoiler mounted to the housing and located adjacent the actuator; and a wing extending from the spoiler adjacent said at least one disk in the depopulated region, the wing having leading and trailing edges, a longitudinal portion, a lateral portion extending from the longitudinal portion aft of the leading edge such that the leading edge is open and concave, a void defined adjacent the longitudinal and lateral portions, and a profile that is not solid.

6. A disk drive according to claim 5, wherein the lateral portion extends perpendicularly from the longitudinal portion at the trailing edge, a second longitudinal portion extending from the lateral portion opposite and parallel to said longitudinal portion, to the leading edge, such that the profile is C-shaped, the trailing edge is rectangular and closed, and the void extends to the open leading edge.

7. A disk drive according to claim 5, wherein the lateral portion comprises a single lateral portion that extends perpendicularly from the longitudinal portion between the leading and trailing edges, a second longitudinal portion extends from the lateral portion opposite and parallel to said longitudinal portion, from the leading edge to the trailing edge, such that the profile is H-shaped and both the leading and trailing edges are open.

8. A disk drive according to claim 5, wherein the lateral portion comprises a single lateral portion that is located adjacent the leading edge and is concave in shape, a second longitudinal portion extends from the lateral portion opposite and parallel to said longitudinal portion, from the leading edge to the trailing edge, such that the trailing edge is open to the void.

9. A disk drive according to claim 5, wherein the lateral portion comprises a pair of lateral portions that extend perpendicularly from the longitudinal portion apart from each other and between the leading and trailing edges, a second longitudinal portion extends from the lateral portions opposite and parallel to said longitudinal portion, from the leading edge to the trailing edge, such that the profile has a Roman numeral "II" shape and both the leading and trailing edges are open.

10. A disk drive according to claim 5, wherein the lateral portion comprises a single lateral portion that extends perpendicularly from the longitudinal portion at the trailing edge, the longitudinal portion comprises a single longitudinal portion, such that the trailing edge is rectangular and the profile is L-shaped.

11. A disk drive according to claim 5, wherein the lateral portion comprises a single lateral portion that extends perpendicularly from the longitudinal portion between the leading and trailing edges, the longitudinal portion comprises a single longitudinal portion, such that both the leading and trailing edges are open.

12. A disk drive according to claim 5, wherein the lateral portion comprises a pair of lateral portions that extend perpendicularly from the longitudinal portion apart from each other and between the leading and trailing edges, the longitudinal portion comprises a single longitudinal portion, the void is located between the pair of lateral portion and is open, and both the leading and trailing edges are open.

* * * * *